(12) United States Patent
Schilling

(10) Patent No.: US 8,635,962 B2
(45) Date of Patent: Jan. 28, 2014

(54) DEPTH ADJUSTMENT ASSEMBLY FOR A DISC OPENER OF AN AGRICULTURAL IMPLEMENT

(75) Inventor: Robin B. Schilling, Darfield (CA)

(73) Assignee: CNH Canada, Ltd., Saskatoon, Saskatchewan (CA)

( * ) Notice: Subject to any disclaimer, the term of this patent is extended or adjusted under 35 U.S.C. 154(b) by 282 days.

(21) Appl. No.: 13/170,814

(22) Filed: Jun. 28, 2011

(65) Prior Publication Data
US 2013/0000536 A1    Jan. 3, 2013

(51) Int. Cl.
*A01C 5/00* (2006.01)

(52) U.S. Cl.
USPC ............ 111/163; 111/134; 111/135; 111/137

(58) Field of Classification Search
USPC .................. 111/134–137, 149, 163, 69, 200
See application file for complete search history.

(56) References Cited

U.S. PATENT DOCUMENTS

| | | | |
|---|---|---|---|
| 1,790,089 A | 1/1931 | Cady | |
| 1,868,539 A | 7/1932 | Morkovski | |
| 3,626,877 A | 12/1971 | Hansen et al. | |
| 4,009,668 A | 3/1977 | Brass et al. | |
| 4,273,057 A | 6/1981 | Pollard | |
| 4,307,674 A | 12/1981 | Jennings et al. | |
| 4,408,551 A | 10/1983 | Keller et al. | |
| 4,422,392 A | 12/1983 | Dreyer et al. | |
| 4,616,713 A | 10/1986 | Shattuck | |
| 4,760,806 A | 8/1988 | Bigbee et al. | |
| 4,995,325 A | 2/1991 | Herriau et al. | |
| 5,081,942 A | 1/1992 | Clark et al. | |
| 5,230,208 A * | 7/1993 | Hess et al. | 56/17.2 |
| 5,697,455 A | 12/1997 | Deckler | |
| 5,829,535 A | 11/1998 | Line | |
| 6,148,747 A | 11/2000 | Deckler et al. | |
| 6,378,280 B1 * | 4/2002 | Bone et al. | 56/17.1 |
| 6,640,732 B2 | 11/2003 | Prairie et al. | |
| 6,644,223 B2 | 11/2003 | Prairie et al. | |
| 6,886,641 B2 | 5/2005 | Ronald et al. | |
| 7,775,025 B1 * | 8/2010 | Coffin et al. | 56/249 |
| 2008/0093093 A1 | 4/2008 | Sheppard et al. | |

* cited by examiner

*Primary Examiner* — Alicia Torres
(74) *Attorney, Agent, or Firm* — Rebecca L. Henkel

(57) ABSTRACT

A depth adjustment assembly for a disc opener or other furrowing device has an eccentric cam with an outer surface that engages and thus prevents rotation of a gauge wheel arm. As rotation of the gauge wheel arm sets the relative position of a gauge wheel relative to the furrowing device, preventing rotation of the arm sets the cutting depth for the furrowing device. The eccentric cam may have a smooth outer edge defining an indiscrete range of positions or a profile outer surface that defines discrete depth setting positions. The eccentric cam is biased into engagement with a receiver by a pin and spring, but overcoming the bias allows the cam to be momentarily disengaged and rotated to reposition the eccentric cam.

16 Claims, 5 Drawing Sheets

DEPTH ADJUSTMENT ASSEMBLY FOR A DISC OPENER OF AN AGRICULTURAL IMPLEMENT

BACKGROUND OF THE INVENTION

The present invention relates generally to ground opener units for an agricultural implement and, more particularly, to a depth adjustment assembly for setting the depth of a coulter or disc of a disc opener unit.

One type of planting implement is commonly equipped with one or more rows of disc or coulters carried by a tool bar, commonly referred to as a disc drill, which is towed by a tractor. Typically, an air cart, which holds seed and/or fertilizer, is also towed by the tractor and pneumatically supplies the individual disc openers with seed and/or fertilizer. The disc openers are attached to the disc drill frame by individualized arms or linkages which allow the disc openers to operate independently of another. This "independence" allows the discs to independently respond to changes in terrain and field obstructions.

Each disc has a generally flat construction that is rotated a few degrees, e.g., 7 degrees, about a vertical axis so that as the disc is pulled through the soil the leading surface of the disc displaces soil and creates a furrow in the soil. Downward pressure on the disc is provided by a spring or hydraulic cylinder to hold the disc at a desired furrowing depth, e.g., desired seeding depth. The depth at which the disc cuts the furrow into the soil is controlled by a gauge wheel that runs in relative close proximity to the disc. In addition to its depth controlling function, for some disc drills, the placement of the gauge wheel close to the disc also assists in keeping the disc surface clean of soil, mud, or debris buildup. Also, the gauge wheel rides over the soil displaced by the disc as the furrow is being cut to prevent the displaced soil from being thrown.

The disc cuts a furrow or trench in the soil into which seed and/or fertilizer is deposited. The seed and/or fertilizer is dropped through a tube into the trench. The trench walls then collapse onto the seed and/or fertilizer when the disc and scraper blade pass. A trailing wheel then packs the soil atop the seed and/or fertilizer. Most disc drills include a spring that is used to adjust the amount of packing pressure applied by the trailing (packer) wheel.

SUMMARY OF THE INVENTION

The present invention provides a depth adjustment assembly for a disc opener or other furrowing device. The depth adjustment assembly has an eccentric cam with an outer surface that engages and thus prevents rotation of a gauge wheel arm. As rotation of the gauge wheel arm sets the relative position of a gauge wheel relative to the furrowing device, limiting rotation of the arm sets the cutting depth for the furrowing device. The eccentric cam may have a smooth outer edge defining an indiscrete range of positions or a profile outer surface that defines discrete depth setting positions. The eccentric cam is biased into engagement with a receiver by a pin and spring, but overcoming the bias of the spring without removal of the pin allows the cam to be momentarily disengaged and rotated to reposition the eccentric cam and thus change the depth setting position reached by the gauge wheel arm.

According to one aspect of the invention, an apparatus for adjusting the penetration depth of a soil tillage device mounted to a frame is provided. The apparatus is designed for use with a soil tillage device having a penetration depth set by a free rotating gauge arm operably associated with a gauge wheel. The gauge arm is configured to be pressed against the apparatus when the soil tillage device is lowered into a ground engaging position. The apparatus includes an indexer configured to be selectively engaged with a cooperating member of the frame and rotatable about an axis of rotation. The apparatus further includes a cam coupled to and rotatable with the indexer. A portion of the cam has a peripheral edge defined perpendicular to the axis of rotation that abuts the depth setting arm connected to the soil tillage device. Engagement of the depth setting arm and the peripheral edge sets a maximum penetration depth for the soil tillage device.

In accordance with another aspect of the invention, a cutting depth setting assembly is provided. The assembly is designed for use with a disc opener apparatus having a coulter rotatably mounted to a frame, a gauge wheel operative to set a desired cutting depth for the coulter, and a gauge arm coupled to the gauge wheel to set the position of the gauge wheel relative to the coulter. The assembly is comprised of a stop rotatably mounted to the frame and operative to engage a portion of the gauge arm and wherein said engagement prevents rotation of the gauge arm to a deeper cutting depth setting. The stop includes an eccentric cam having an outer edge that abuts against the portion of the gauge arm when the gauge arm is engaged with the stop and the outer edge of the eccentric cam defines a range of cutting depths for the coulter. A fastener attaches the stop to the frame, and has a head portion and a shank extending from the head portion. A biasing device holds the stop in engagement with the frame, and the bias of the biasing device may be overcome by pulling the stop towards the head portion of the fastener. Moreover, sufficiently pulling of the stop towards the head portion of the fastener disengages the stop from the frame without detaching the fastener from the frame to allow rotation of the stop to a new maximum cutting depth position.

In accordance with a further aspect of the invention, a disc opener apparatus comprises a frame adapted to be mounted to a tool bar, a coulter rotatably mounted to the frame, a gauge wheel rotatably mounted to the frame, a gauge arm coupled to the gauge wheel and operative to set a depth of the gauge wheel relative to the coulter, and a depth adjustment assembly mounted to the frame and adapted to stop rotation of gauge arm past a user-desired position. The depth adjustment assembly includes a receiver mounted to the frame, an indexer attached to the frame and engageable with the receiver. The indexer is configured to rotate about an axis of rotation when disengaged from the receiver. The assembly further has an eccentric cam having an oft-centered lobe and coupled to the indexer such that rotation of the indexer relative to the receiver changes the angular position of the oft-centered lobe relative to the axis of rotation. The oft-centered lobe has an edge portion that abuts against the gauge arm to prevent further rotation of the gauge arm past the user-desired position.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
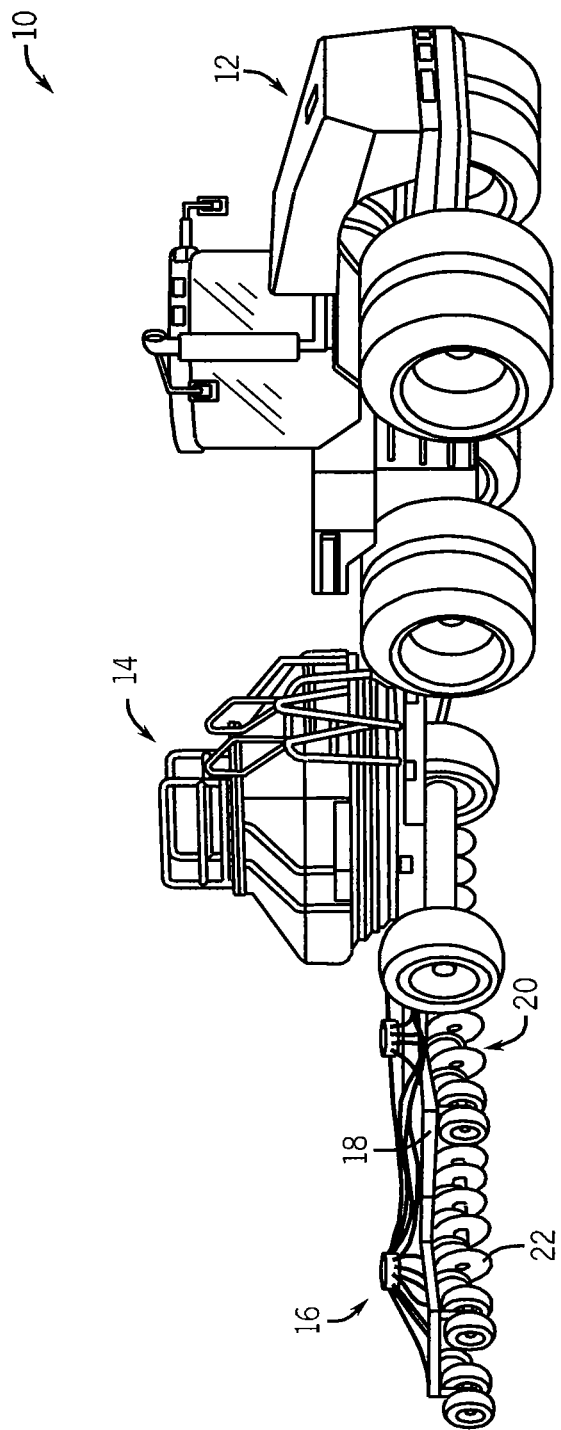
FIG. 1 is a pictorial view of an agricultural system generally comprised of tractor, an air cart, and a disc drill having a set of disc openers.

Referring now to the drawings, and more particularly to FIG. 1, an agricultural seeding system 10 is shown and, as known in the art, is generally comprised of a tractor 12, an air cart 14, and a seeder 16. The air cart 14 and the planter 16 are hitched to the tractor 12 in a conventional manner. The planter 16 includes a tool bar 18 to which a set of disc opener units 20 are coupled. The disc opener units 20 each include a disc 22 designed to cut a furrow into the soil. As known in the art, the air cart 14 pneumatically delivers seed and/or fertilizer to a set of delivery tubes (not shown) of the seeder 14 whereupon the seed and/or fertilizer is deposited in seed trenches or furrows cut by the discs 22.

Figure 2:
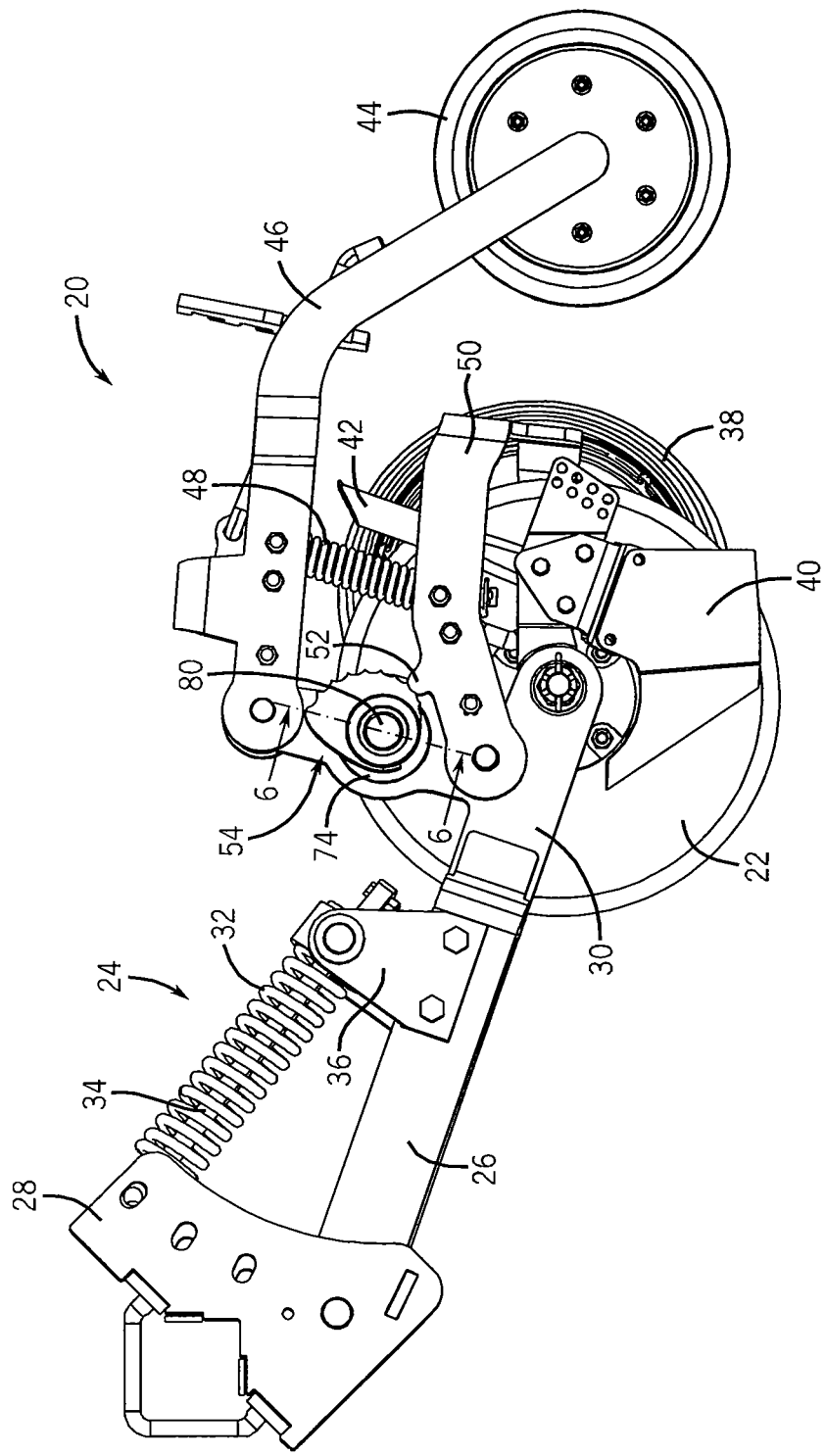
FIG. 2 is a side elevation view of a disc opener unit of the disc drill of FIG. 1.

An exemplary disc opener unit 20 is shown in FIG. 2. Each disc opener unit 20 includes a linkage assembly 24 that in the illustrated unit includes link 26 extending rearwardly from a toolbar mount 28, which is used to couple the disc opener unit 20 to the tool bar 18 in a known manner, and an opener frame 30 that carries a disc 22 and other components, as will be described more fully below. The opener unit 20 includes a spring 32 slidable along a post 34. It is contemplated that the link 26 and the opener frame 30 could be integrally formed as a single structural component. The post 34 is connected at one end to the toolbar mount 28 and at the opposite end to a bracket 36, which is fastened to link 26 in a conventional manner. Spring 32 applies downward pressure on the disc 22 as known in the art. Alternately, a hydraulic cylinder may be used to apply such downward pressure.

Disc penetration is controlled by a gauge wheel 38 that is positioned in relative close proximity to the disc 22. In addition to controlling the penetration depth of the disc 22 the gauge wheel 38 also helps in keeping the adjacent side of the disc 22 clear of debris. A scraper blade 40 is provided on the opposite side of the disc 22 to keep the leading face of the disc 22 clear of soil, mud, and debris. In one preferred embodiment, the disc 22 is angled at an offset of approximately 7 degrees from vertical; although, different orientations are contemplated. The leading side of the disc 22 displaces soil and creates a furrow in the soil as the disc 22 is pulled through the soil by the tractor 12. In addition to providing a scraping function the scraper blade 40 also helps to hold the furrow open as seed and/or fertilizer is deposited into the furrow.

The disc opener unit 20 also carries a boot or seedtube 42 that is flowcoupled to the air cart 14. As known in the art, seed, fertilizer, or other commodity is provided to the tube 42 which drops the commodity into the furrow. A trailing wheel 44, coupled to the frame 30 by arm 46, packs the furrow after the commodity has been deposited. The amount of packing pressure applied by the trailing wheel 44 is controlled by a spring 48 as known in the art; although, it is contemplated that other types of biasing devices may be used.

As noted above, the gauge wheel 38 controls the penetration depth of the disc 22. The gauge wheel 38 is connected to a gauge wheel arm 50 that is in turn coupled to the link 26. In many disc opener assemblies, the relative position of the gauge wheel 38 relative to the disc 22 can be set by positively moving the gauge wheel arm to a desired depth setting. This positive movement of the gauge wheel arm effectively changes the position of the gauge wheel and thus the position of the disc. Essentially, the downward bias on the disc opener drives the gauge wheel into contact with the ground and causes the disc to cut a furrow at the depth setting set by the position of the gauge wheel arm. An example of such a disc opener unit is described in U.S. Ser. No. 12/651,959, the disclosure of which is incorporated herein.

The present invention in contrast provides a free-floating gauge wheel arm 50 having a stop 52 that is designed to interface with a depth adjustment assembly 54. The stop 52, in the illustrated embodiment, is in the form of a tab extending outwardly from the body of the gauge wheel arm 50. It is understood that other types of stops may be used provided such stops interface with depth adjustment assembly 54. As will be described more fully below, the depth adjustment assembly 54 is designed to prevent rotation of the gauge wheel arm 50. Thus, regardless of the setting of the depth adjustment assembly 54 (which will be described shortly), the gauge wheel arm 50 engages the depth adjustment assembly 54 thereby preventing further rotation of the gauge wheel arm 50. Hence, the desired cutting depth for the disc 22 is set by setting the position of the depth adjustment assembly 54 and then allowing the gauge wheel arm 50 to rotate into engagement with the depth adjustment assembly 54. In a preferred embodiment, the depth adjustment assembly 54 permits the gauge wheel arm 50 to rotate to a shallower setting during use but does not allow the gauge wheel arm 50 to rotate to a deeper setting. However, it is also contemplated that the down pressure applied on the disc opener unit 20 when the disc 22 is engaged with the soil may prevent the gauge wheel 38 from moving relative to disc 22 thereby preventing the gauge wheel arm 50 from rotating to a shallower setting. It is contemplated however that the depth adjustment assembly 54 may be constructed to "lock" the gauge wheel arm 50 in place thereby preventing rotation of the gauge wheel arm 50 during use of the disc opener unit 20.

Figure 6:
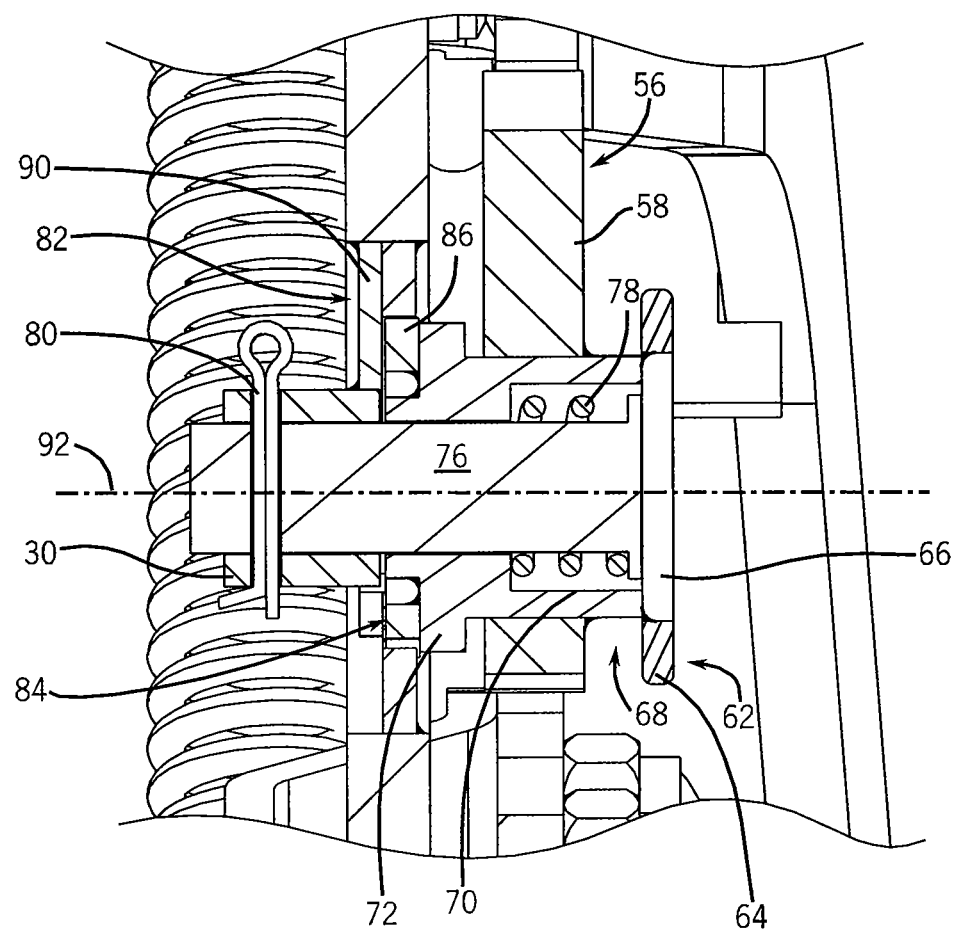
FIG. 6 is a section view of the disc opener unit taken along line 66 of FIG. 2.

With additional reference to FIGS. 36, the depth adjustment assembly 54 is comprised of an indexer 56 having a body 58 with an opening 60 formed therein. The opening 60 is sized to receive a handle 62, which in the illustrated embodiment, has an annular body 64 with an opening 66 formed therein. The handle 62 is secured in a conventional manner, i.e., welding, to a nut 68 having a boss 70 extending outwardly (away from the opener frame 30) from a shoulder 72. The annular inner wall (not numbered) of the boss 70 defines an elongated channel 74 that communicates with opening 66 formed in the handle 62. Openings 60, 66 align with one another and the elongated channel 74 when the depth adjustment assembly 54 is assembled, which allows a pin 76 and a spring 78 to be inserted therethrough and fastened to opener frame 30 using cotter pin 80, as best shown in FIG. 6. The pin 76 attaches the handle 62 and indexer 56 to the frame 30 and the spring 78 biases the indexer 56 into engagement with a receiver 82 formed in or otherwise attached to the opener frame 30.

The indexer 56 includes a ring 84 having a set of teeth 86 arranged in a radial pattern around an opening 88. The teeth 86 are designed to mesh with corresponding teeth 90 of the receiver 82. While the bias of the spring 78 urges the teeth 86 into engagement with their complementary teeth of the receiver, the spring bias can be overcome by a user pulling axially on handle 62 away from the opener frame 30. The pin 76, which extends along an axis of rotation 92 for the handle 62 and indexer 56, maintains the engagement of the indexer 56 with the frame 30 but the indexer 56 is momentarily free to rotate relative to the receiver 82 about the axis of rotation 92, which allows the user to reposition of the indexer body 58. The indexer 58 is in the form of an eccentric cam and thus has a lobe portion 94 extending outwardly from the opening 60. It will thus be appreciated that the opening 60 is not centered in body 58. As a result, when the indexer 56 is rotated about the axis of rotation 92, the radial position of the lobe portion 94 relative to the opening 60 changes. This feature of the depth adjustment assembly 54 is used to set the cutting depth of the disc 22.

The body 58 has an outer edge 96 defined around the lobe portion 94. The outer edge 96 provides a generally planar face (defined perpendicular to the axis of rotation 92 of the handle 62) that is designed to sit against a surface of the gauge wheel arm 50 to prevent further rotation of gauge wheel arm 50. In one embodiment, which is illustrated in the figures, the outer edge 96 is profiled so that a set of recesses 98 are formed. In the illustrated embodiment, the recesses 98 are in the form of concave depressions ("scallops"); although, other shaped recesses are possible and considered within the scope of the invention. It is understood that the number and/or spacing of the recesses 98 may be different from that illustrated in the figures. Moreover, while the recesses 98 are preferably constructed to define a linear range of depths for the disc 22, it is understood that the recesses 98 could be arranged to define a nonlinear range of depth settings. One advantage of the profiled outer edge 96 is that the set of recesses 98 define discrete depth setting positions for the gauge wheel arm 50. In one embodiment, the difference between adjacent recesses 98 results in a quarter-inch difference in cutting depth of the disc 22. It is understood that markings or other indicia may be used to identify the cutting depth associated with each of the recesses 98.

In an alternate embodiment, the outer edge 96 is smooth and thus represents a continuous range of depth setting positions for the disc 22. It is understood that markings (not shown) may be etched or otherwise formed onto the body 58 of the indexer 56 to provide guidance to a user as to the range of possible depth setting positions. An advantage of a smooth outer edge 96 is that more depth setting positions may be defined. However, it is believed that a profiled indexer 56 may provide greater user repeatedly and thus greater user comfort. Additionally, it is understood that other types of arrangements could be used to set a desired position of the gauge wheel arm 50 and lock the gauge wheel arm 50 at that position. It is also understood that the shape of the indexer 56 may be different from that illustrated in the drawings. For example, it is understood that the outer edge 96 may be profiled to form multiple sets of recesses. Each set of recesses could represent a limited range of depth setting positions with different spacing between adjacent depth setting positions. For example, one set of recesses could be used to set the depth of the disc 22 at quarter-inch settings whereas another set of recesses could be used to set the depth at half-inch or eighth-inch intervals, for example. Additionally, it is contemplated that the crop markings rather than numerical depth settings. Thus, for example, to assist a user in setting the cutting depth for planting corn, a "corn" position may be identified on the indexer. For soybeans, a "soybean" position may be identified on the indexer. Similar markings could be used for other crops such as wheat, alfalfa, soybeans, and the like.

Figure 3:
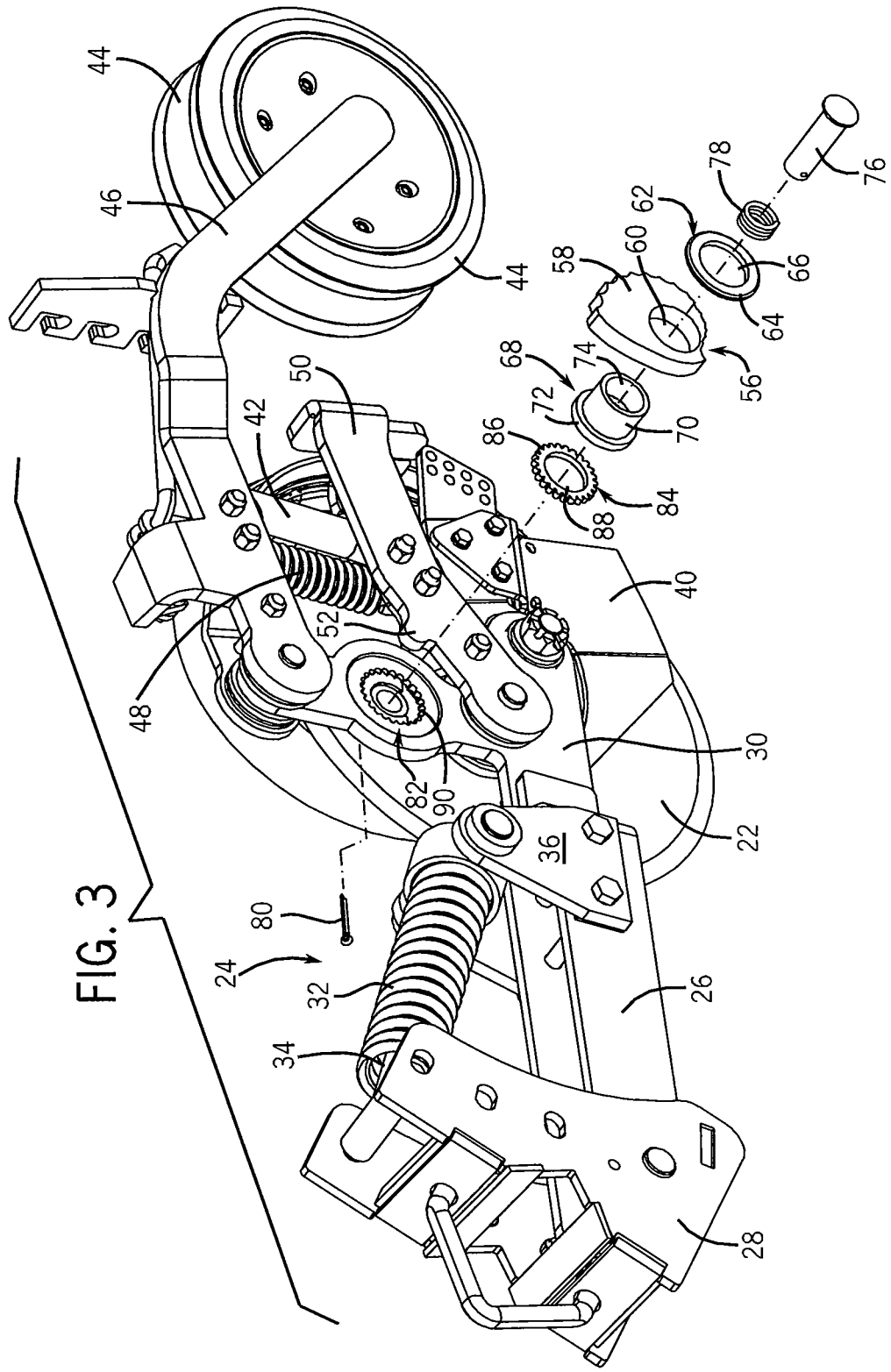
FIG. 3 is an exploded view of the disc opener unit of FIG. 2.
Figure 4:
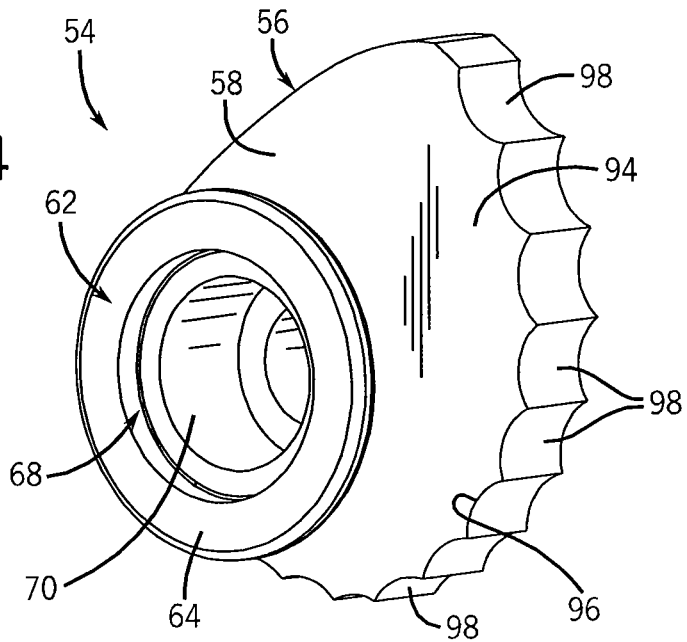
FIG. 4 is a front isometric view of a depth setting indexer of the disc opener unit of FIG. 2 according to the invention.
Figure 5:
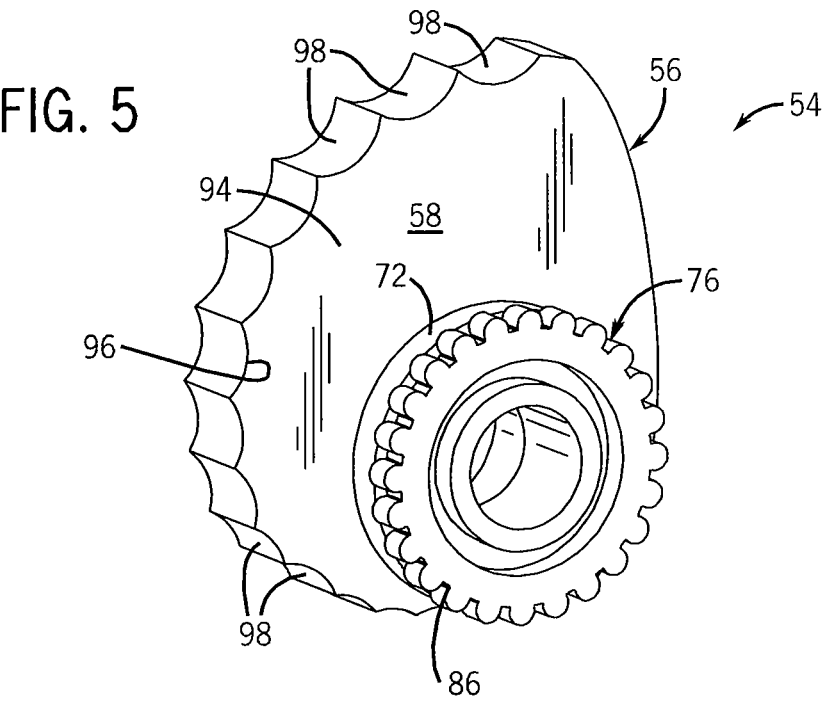
FIG. 5 is a rear isometric view of the depth setting indexer of FIG. 4.

Referring briefly again to FIG. 3, components 58, 62, 68, and 84 are preferably formed as a single integral structure using a known fabrication technique. For example, these components could be weld together. Alternately, these components could be cast as a single structure. Other fabrication techniques could also be used.

Many changes and modifications could be made to the invention without departing from the spirit thereof The scope of these changes will become apparent from the appended claims.

I claim:

1. An apparatus for adjusting the penetration depth of a soil tillage device mounted to a frame, the apparatus comprising:
   an indexer selectively engaged with a cooperating member of the frame and rotatable about an axis of rotation, the indexer including a set of teeth in a radial spaced arrangement about the axis of rotation that is configured to mesh with a complementary set of teeth of the frame;
   a cam coupled to and rotatable with the indexer, a portion of the cam having a peripheral edge perpendicular to the axis of rotation, the peripheral edge of the cam including a plurality of scallops formed therein which correspond to respective desired depth settings for the soil tillage device;
   a gauge wheel operative to set a desired cutting depth for the tillage device;
   a gauge arm coupled to the gauge wheel and pivotably coupled to the frame, the gauge arm including a stop projecting therefrom which is engageable with a selected one of the plurality of scallops for setting a desired penetration depth for the soil tillage device; and
   wherein engagement of the set of teeth of the indexer with the complementary set of teeth of the frame prevents of the indexer and the cam with respect to the frame.

2. The apparatus of claim 1 wherein the cam has an outwardly extending lobe and the peripheral edge is formed along an edge of the lobe.

3. The apparatus of claim 1 further comprising a pin and spring coupling the indexer to the frame, the pin and spring extending along the axis of rotation and the spring biasing the indexer against the frame.

4. The apparatus of claim 3 wherein the indexer is movable laterally away from the frame by overcoming the bias of the spring, and wherein movement of the indexer sufficiently away from the frame allows the indexer to be rotated about the axis of rotation without fully decoupling the indexer from the frame.

5. The apparatus of claim 1 wherein the plurality of scallops are spaced equidistantly from one another along the peripheral edge.

6. The apparatus of claim 5 wherein the plurality of scallops represent a linear range of desired depth settings for the soil tillage device.

7. The apparatus of claim 6 wherein the difference in depth setting between adjacent scallops is a quarter-inch.

8. The apparatus of claim 1 wherein the soil tillage device is a coulter.

9. A cutting depth setting assembly for a disc opener apparatus having a coulter rotatably mounted to a frame, a gauge wheel operative to set a desired cutting depth for the coulter, and a gauge arm coupled to the gauge wheel to set the position of the gauge wheel relative to the coulter, the assembly comprising:
   a stop projecting from the gauge arm:
   an eccentric cam rotatably mounted to the frame and operative to engage the stop projecting from the gauge arm so as to prevent rotation of the gauge arm to a deeper cutting depth setting, the eccentric cam having an outer edge having a plurality of discrete depth settings formed therein defining a range of cutting depths for the coulter;

a fastener attaching the eccentric cam to the frame, the fastener having a head portion and a shank extending from the head portion; and a biasing device biasing the eccentric cam in engagement with the frame, the bias of the biasing device being overcome by pulling the eccentric cam towards the head portion of the fastener;

wherein:

the stop is engageable with a selected one of the plurality of discrete depth settings to set a desired penetration depth for the coulter and to limit rotation of the gauge arm; and pulling of the eccentric cam towards the head portion of the fastener disengages the eccentric cam from the frame without detaching the fastener from the frame to allow rotation of the eccentric can to a new cutting depth position.

10. The assembly of claim 9 wherein the outer edge of eccentric cam includes a set of recesses.

11. The assembly of claim 10 wherein the recesses are spaced equidistantly from one another along the outer edge of the eccentric cam.

12. The assembly of claim 11 wherein a change in cutting depth provided by adjacent recesses is 0.25 inches.

13. A disc opener apparatus comprising:
a frame adapted to be mounted to a tool bar;
a coulter rotatably mounted to the frame;
a gauge wheel rotatably mounted to the frame;
a gauge am coupled to the gauge wheel and operative to set a depth of the gauge wheel relative to the coulter, the gauge arm including a stop projecting therefrom; and
a depth adjustment assembly mounted to the frame and adapted to stop rotation of gauge arm past a user-desired position, the depth adjustment assembly including:
a receiver mounted to the frame;
an indexer attached to the frame and engageable with the receiver, the indexer configured to rotate about an axis of rotation when disengaged from the receiver;
an eccentric cam having an off-centered lobe and being coupled to the indexer such that rotation of the indexer relative to the receiver changes the angular position of the off-centered lobe relative to the axis of rotation, the oft-centered lobe includes an edge portion having a plurality of discrete depth settings formed therein;

wherein:

the receiver includes a first set of teeth and the indexer includes a second set of teeth such that engagement of the teeth prevent rotation of the indexer relative to the receiver:, each of the plurality of discrete depth setting defines a corresponding cutting depths for the coulter; and the stop is engageable with a selected one of the plurality of discrete depth settings to set a desired penetration depth for the coulter and to limit rotation of the gauge arm away from the user-desired position.

14. The apparatus of claim 13 wherein the plurality of discrete depth settings lobe includes a series of scallop shaped recesses and wherein the plurality of discrete depth settings define at least three different depth settings with the difference in depth between a first and second depth setting is the same as the difference in depth between the second and third depth settings.

15. The apparatus of claim 13 wherein the depth adjustment assembly includes a handle for rotating the indexer relative to the receiver.

16. The apparatus of claim 13 wherein the depth adjustment assembly further includes a pin and spring attaching the indexer to the frame and wherein the spring biases the indexer into engagement with the receiver and wherein the bias of the spring may be overcome to withdraw the indexer from engagement with the receiver to rotate the indexer relative to the receiver without fully detaching the indexer from the frame.

* * * * *